United States Patent
Hazelton

(10) Patent No.: US 9,140,172 B2
(45) Date of Patent: Sep. 22, 2015

(54) GAS FLOW DISTRIBUTING FLEXIBLE COUPLING

(71) Applicant: GM GLOBAL TECHNOLOGY OPERATIONS LLC, Detroit, MI (US)

(72) Inventor: Gary J. Hazelton, White Lake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 136 days.

(21) Appl. No.: 13/954,486

(22) Filed: Jul. 30, 2013

(65) Prior Publication Data

US 2015/0033734 A1    Feb. 5, 2015

(51) Int. Cl.
*F01N 1/00* (2006.01)
*F01N 13/08* (2010.01)
*F16L 27/10* (2006.01)
*F01N 13/18* (2010.01)

(52) U.S. Cl.
CPC ............ *F01N 13/08* (2013.01); *F01N 13/1816* (2013.01); *F16L 27/1004* (2013.01)

(58) Field of Classification Search
USPC ........... 60/272, 280, 312, 313, 322, 323, 324; 285/49, 223, 226, 227, 236, 300
See application file for complete search history.

(56) References Cited

U.S. PATENT DOCUMENTS

| | | | | |
|---|---|---|---|---|
| 5,069,487 A | * | 12/1991 | Sheppard | 285/226 |
| 5,511,828 A | * | 4/1996 | Kurek et al. | 285/49 |
| 6,151,893 A | * | 11/2000 | Watanabe et al. | 60/322 |
| 6,415,603 B1 | * | 7/2002 | Nowka et al. | 60/322 |
| 6,488,313 B1 | * | 12/2002 | Thomas | 285/49 |
| 6,554,321 B1 | * | 4/2003 | Boisseau et al. | 285/49 |
| 7,451,785 B2 | * | 11/2008 | Taira et al. | 138/118 |
| 2011/0099990 A1 | * | 5/2011 | Lang et al. | 60/320 |

\* cited by examiner

*Primary Examiner* — Binh Q Tran
(74) *Attorney, Agent, or Firm* — Quinn Law Group, PLLC

(57) ABSTRACT

A coupling for routing and distributing exhaust gas flow from an internal combustion engine is disclosed. The coupling includes an upstream duct having a first end and a second end, and a gas flow distribution device arranged between the first and second ends of the upstream duct. The coupling also includes a downstream duct having a first end and a second end, and a flexible portion arranged between the first and second ends of the downstream duct. The upstream duct is fixed to the downstream duct to generate a continuous, sealed passage for the gas flow between the first end of the upstream duct and the second end of the downstream duct. A vehicle is also disclosed having an engine employing an exhaust after-treatment device and the coupling for routing and distributing the gas flow from the engine to the after-treatment device.

20 Claims, 1 Drawing Sheet

GAS FLOW DISTRIBUTING FLEXIBLE COUPLING

TECHNICAL FIELD

The present disclosure is drawn to a flexible coupling configured to distribute gas flow in an exhaust system of an internal combustion engine.

BACKGROUND

Internal combustion (IC) engines typically include exhaust systems designed to collect, route, and discharge the engine's exhaust gases. Exhaust systems of modern IC engines also include various exhaust after-treatment devices, such as particulate filters and other devices, to effectively convert toxic byproducts of combustion to less toxic substances by way of catalyzed chemical reactions.

In the case of compression-ignition or diesel engines, a great deal of effort continues to be expended to develop practical and efficient after-treatment (AT) systems and methods to reduce emissions of largely carbonaceous particulates otherwise present in the engine's exhaust gas. An AT system for a modern diesel engine exhaust typically incorporates a diesel oxidation catalyst (DOC) as one of the devices for such a purpose. A DOC generally contains precious metals, such as platinum and/or palladium, which serve as catalysts to oxidize hydrocarbons and carbon monoxide present in the exhaust flow into carbon dioxide and water. The DOC may be used to convert nitrogen monoxide (NO) that is emitted in the engine's exhaust gas stream into nitrogen dioxide ($NO_2$).

An exhaust AT system may also employ a chemical process known as selective catalytic reduction (SCR) for converting oxides of nitrogen ($NO_X$) with the aid of the $NO_2$ generated by the DOC, a catalyst, and a reductant into diatomic nitrogen ($N_2$) and water ($H_2O$). The reductant, which may be an aqueous solution of urea, is generally injected into the engine's exhaust stream during engine operation in proportion to consumption of the engine's fuel. Once in the exhaust stream, the reductant is absorbed onto the system's SCR catalyst where the conversion of $NO_X$ takes place.

SUMMARY

A coupling for routing and distributing exhaust gas flow from an internal combustion (IC) engine is disclosed. The coupling includes an upstream duct having a first end and a second end, and a gas flow distribution device arranged between the first and second ends of the upstream duct. The coupling also includes a downstream duct having a first end and a second end, and a flexible portion arranged between the first and second ends of the downstream duct. The upstream duct is fixed to the downstream duct to generate a continuous, sealed passage for the gas flow between the first end of the upstream duct and the second end of the downstream duct.

The gas flow distribution device may be arranged proximate the second end of the upstream duct, while the flexible portion may be arranged proximate the first end of the downstream duct.

The upstream duct may extend at least partially through the downstream duct. Additionally, the upstream duct may be fixed to the downstream duct proximate the first end of the downstream duct.

The first end of the upstream duct may include a mounting flange for attachment to one of an exhaust manifold and a turbocharger of the engine. Furthermore, the second end of the downstream duct may include a mounting flange for attachment to an exhaust after-treatment device.

The flexible portion of the gas flow distribution device may be configured as a corrugated pipe. Additionally, the flexible portion may be defined by a length and an internal diameter, while the gas flow distribution device may be arranged along the length of the flexible portion when the second end of the upstream duct is fixed to the downstream duct.

The flexible portion may be arranged substantially concentrically around the gas flow distribution device when the second end of the upstream duct is fixed to the downstream duct.

Each of the flexible portion and the gas flow distribution device may be constructed from stainless steel to withstand elevated operating temperatures.

A vehicle is also disclosed having an IC engine that employs an exhaust after-treatment (AT) device for processing exhaust gas flow from the engine and the coupling for routing and distributing the gas flow from the engine to the AT device.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
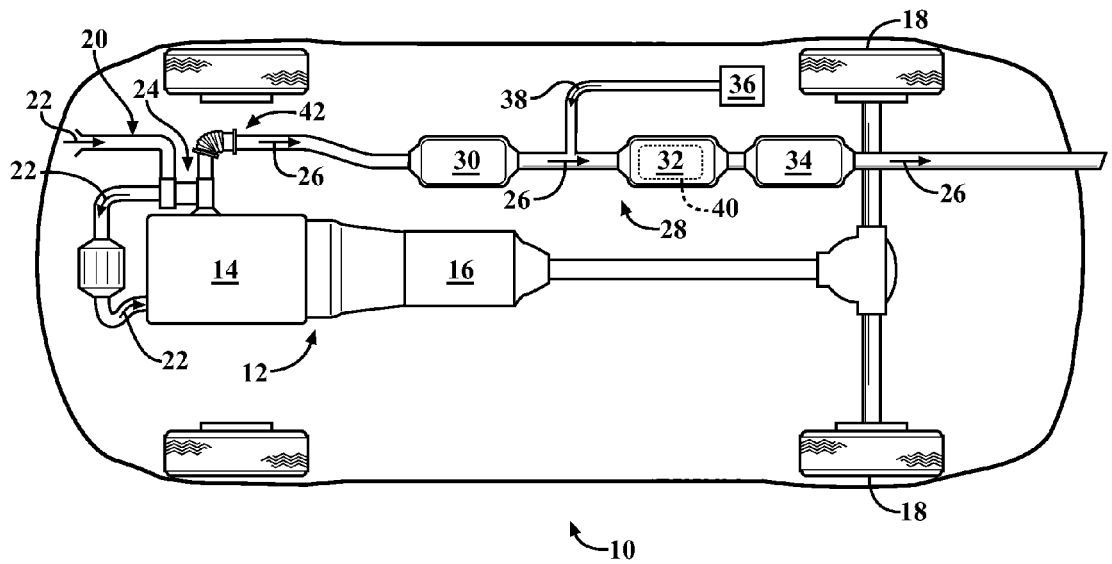
FIG. 1 is a schematic illustration of a vehicle employing an internal combustion engine in fluid communication with an exhaust after-treatment (AT) device via a flexible coupling.

Referring to the drawings, wherein like reference numbers refer to like components throughout the several views, FIG. 1 schematically depicts a vehicle 10. The vehicle 10 employs a powertrain 12. The powertrain 12 includes an internal combustion engine 14, a transmission 16, and drive wheels 18, wherein the engine is configured to power the vehicle by sending engine torque through the transmission to the drive wheels. The engine 14 may be a diesel, i.e., a compression-ignition type, or a gasoline, i.e., a spark-ignition type, of an engine. Although the vehicle 10 is depicted as having a standard powertrain 12, where the primary powerplant is the engine 14, the vehicle may also be a hybrid type, where one or more electric motors (not shown) are used in powering the vehicle.

The engine 14 includes an air intake system 20. The air intake system 20 is configured to deliver an ambient airflow 22 to the engine 14 for subsequent combining of the airflow and an appropriate amount of fuel inside the engine's combustion chambers. As shown, the engine 14 may also include an engine exhaust-driven turbocharger 24. The turbocharger 24 is operable to increase volumetric efficiency of the engine 14 by pressurizing the incoming airflow 22 for subsequent delivery of the pressurized air charge to the engine's combustion chambers. As shown, the turbocharger 24 is energized by a stream of exhaust gas 26 that is emitted by the engine 14 following each combustion event as a by-product of combustion and is removed to the ambient after the turbocharger through an exhaust system 28. The exhaust system 28 includes an exhaust after-treatment (AT) system having at least one exhaust AT device configured to receive and process flow of the exhaust gas 26 from the engine 14 for reduction of toxic exhaust gas emissions.

In the event that the engine 14 is a diesel engine, as shown in FIG. 1, the exhaust system 28 may include a series of exhaust after-treatment devices, shown as a diesel oxidation catalyst 30, a selective catalytic reduction (SCR) catalyst 32, and a diesel particulate filter 34. The shown series of exhaust after-treatment devices 30, 32, and 34 is employed to reduce various exhaust emissions of engine 14. Specifically, the diesel oxidation catalyst 30 is adapted to receive exhaust gas 26 from the engine 14 to oxidize and burn hydrocarbon emissions present in the exhaust gas. Following the diesel oxidation catalyst 30, the exhaust gas 26 is routed to the SCR catalyst 32, which is employed to reduce the emission of $NO_X$.

In general, SCR is a process employed for converting oxides of nitrogen, also referred to as $NO_X$ with the aid of a catalyst into diatomic nitrogen, $N_2$, and water, $H_2O$. SCR is frequently employed to reduce $NO_X$ emissions in the exhaust of internal combustion engines used to power motor vehicles. Exhaust emissions of both gasoline and diesel engines may be improved by SCR. Following the SCR catalyst 32, but before the exhaust gas 26 is allowed to pass to the atmosphere, the gas stream is routed through the diesel particulate filter 34. The diesel particulate filter 34 is configured to collect and dispose through a regeneration process sooty hydrocarbon particulate matter emitted by the engine 12. Timely regeneration of the diesel particulate filter 34 is typically required to unload the deposited hydrocarbon emissions in order to control temperatures inside the catalyst. Although, as shown, the SCR catalyst 32 is positioned upstream of the diesel particulate filter 30, the SCR catalyst may also be positioned downstream of the diesel particulate filter without affecting the effectiveness of the exhaust after-treatment devices 30, 32, and 34 in the after-treatment of the exhaust gas stream 26.

As also shown in FIG. 1, the vehicle 10 additionally includes a reservoir 36 configured to supply a metered amount of a diesel-exhaust-fluid (DEF) 38 into the exhaust gas stream 26 upstream of the SCR catalyst 32. A general term "diesel-exhaust-fluid" or DEF is used to describe a reductant that is employed by selective catalytic reduction (SCR) in diesel engines. DEF 38 is a gaseous reductant, typically anhydrous ammonia, aqueous ammonia, or urea, that is added to a stream of exhaust gas and is absorbed onto the catalyst. The DEF 38 accesses the SCR catalyst 32 as the exhaust gas 26 flows through SCR catalyst. An inner surface of the SCR catalyst 32 includes a wash coat 40. The wash coat 40 serves to attract the DEF 38 in order to deposit the DEF within the SCR catalyst 32 such that the DEF may interact with the exhaust gas 26 and generate a chemical reaction to reduce $NO_X$ emissions from the engine 14.

In the event that the engine 14 is a gasoline engine (not shown), a three-way catalytic converter, which is a gas-engine-specific exhaust after-treatment device, may be employed. As understood by those skilled in the art, a three-way catalytic converter is an exhaust after-treatment device that simultaneously performs three tasks: i) oxidation of nitrogen oxides, ii) oxidation of carbon monoxide, and iii) oxidation of unburned hydrocarbons. Similar to the diesel-engine-specific diesel particulate filter 34 described above, the three-way catalytic converter may be regenerated to unload the deposited hydrocarbon emissions in order to forestall elevated temperatures in the catalyst that may eventually cause damage thereto.

Figure 2:
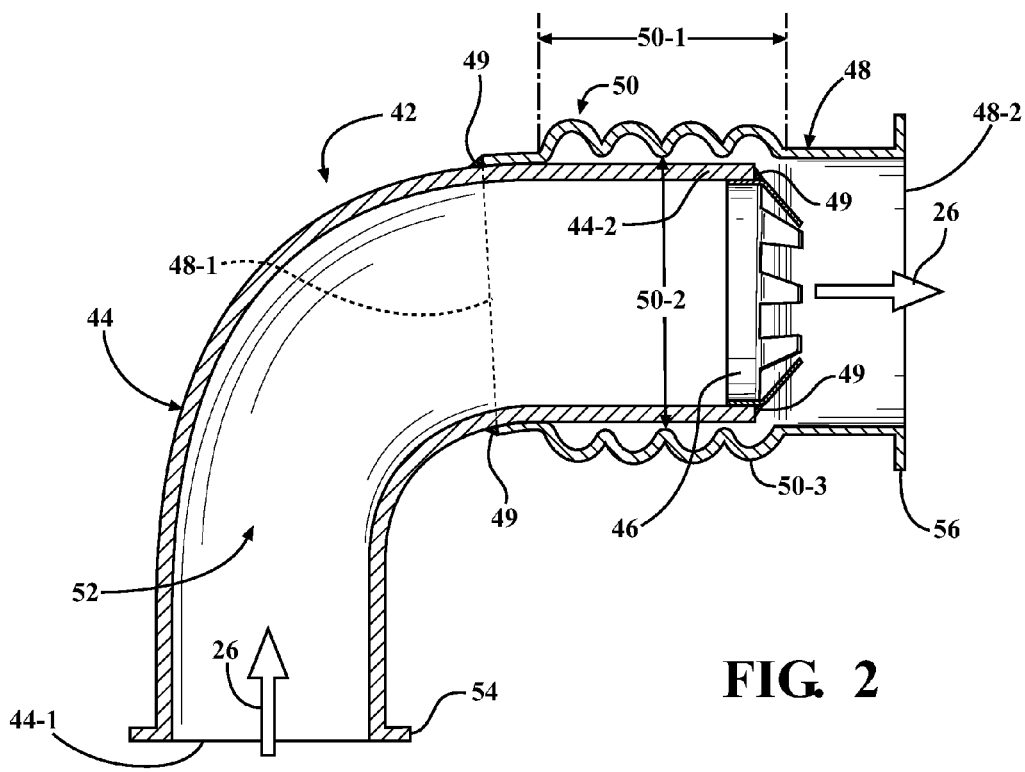
FIG. 2 is a cross-sectional side view of the flexible coupling shown in FIG. 2.

Effectiveness of the each of the above-described AT devices is directly affected by distribution of the exhaust gas 26 across the face of the particular device. Additionally, because the engine 14 typically experiences vibration during its operation in the vehicle 10, while the exhaust system 28 may shake and/or oscillate in response to the vehicle traversing uneven ground, it may be desired to decouple the movement of the exhaust system from that of the engine while maintaining fluid communication therebetween. In order to affect such function in a compact package, the exhaust system 28 also includes a flexible coupling 42, as shown in FIGS. 1 and 2. The flexible coupling 42 is positioned between the engine 14 and the appropriate AT device, which in FIG. 1 is shown as diesel oxidation catalyst 30. Accordingly, the flexible coupling 42 is configured to route the exhaust gas 26 from the engine 14 and distribute the flow of exhaust gas to the diesel oxidation catalyst 30.

As shown in FIG. 2, the flexible coupling 42 includes an upstream duct 44, commonly known as a flame tube, having a first end 44-1 and a second end 44-2. The upstream duct 44 also includes a gas flow distribution device 46 arranged between the first and second ends 44-1, 44-2 and configured to mix and distribute the exhaust gas 26 to the diesel oxidation catalyst 30. The flow distribution device 46 may be separately formed and subsequently welded into the upstream duct 44 or integrally formed with the upstream pipe using common forming methods. Although the AT device that the flow distribution device 46 acts upon directly is shown as the SCR catalyst 32, nothing precludes any of the other AT devices described above from being positioned in place of the shown diesel oxidation catalyst 30, as required by the operation of the engine's AT system. For example, the flexible coupling 42 may be positioned immediately upstream of the SCR catalyst 32. In such a case, the DEF 38 may be injected into the exhaust gas stream 26 between the flow distribution device 46 and the SCR catalyst 32 such that the DEF is introduced into the already mixed and distributed exhaust gas prior to the DEF coming in contact with the SCR catalyst.

The flexible coupling 42 also includes a downstream duct 48 having a first end 48-1 and a second end 48-2. The downstream duct 48 includes a flexible portion 50 arranged between the first and second ends 48-1, 48-2. The flexible portion 50 is configured to decouple the movement of the exhaust system 28 from that of the engine 14 while maintaining a sealed passage for discharging the engine's exhaust gas 26. As may be seen from FIG. 2, the second end 44-2 of the upstream duct 44 is fixed to the downstream duct 48 to generate a continuous, sealed passage 52 for the exhaust gas 26 to flow between the first end 44-1 of the upstream duct 44 and the second end 48-2 of the downstream duct 48. The sealing of the upstream duct 44 to the downstream duct 48 may be accomplished via a suitable weld 49 extending around the perimeter of the joint between the subject components such that the resultant seam blocks leakage of exhaust gas 26 therethrough.

As shown in FIG. 2, the gas flow distribution device 46 may be arranged proximate the second end 44-2 of the upstream duct 44. Additionally, the gas flow distribution device 46 may be attached to the downstream duct 48 via a suitable weld, such as the weld 49 shown in FIG. 2. Furthermore, the flexible portion 50 may be arranged proximate the first end 48-1 of the downstream duct 48. As shown, the upstream duct 44 may extend at least partially through the downstream duct 48. Additionally, the upstream duct 44 may be fixed, such as via the above discussed weld 49, to the downstream duct 48 either proximately or right at the first end 48-1 of the downstream duct. The first end 44-1 of the upstream duct 44 includes a mounting flange 54 for attachment to the turbocharger 24 or an exhaust manifold of the engine 14 that, although not shown, is known by those skilled in the art. Additionally, the second end 48-2 of the downstream duct 48 may include a mounting flange 56 for attachment to an AT device, which in FIG. 1 is specifically shown as the diesel oxidation catalyst 30. In an alternative embodiment of the engine 14 configured as a gasoline engine, the AT device may be configured as a three-way catalytic converter described above.

The flexible portion 50 of the flexible coupling 42 may be configured as a structure permitting relative movement between the upstream and the downstream ducts 44, 48, such as a corrugated pipe (shown in FIG. 2), a metal mesh (not shown), or a combination of the two. The flexible portion 50 may be defined by a length 50-1 and an internal diameter 50-2. The gas flow distribution device 46 may be arranged along the length 50-1 of the flexible portion 50 when the continuous, sealed passage 52 is generated. As shown in FIG. 2, the gas flow distribution device 46 may be arranged proximate to a rearmost or final downstream corrugation 50-3 to minimize a possibility of the exhaust gas 26 generating a "whistle" across the corrugations. Furthermore, the flexible portion 50 may be arranged substantially concentrically around the gas flow distribution device 46 when the continuous, sealed passage 52 is generated, such that the flow distribution device is substantially centered with respect to the internal diameter 50-2.

Each of the components of the flexible coupling 42, such as the flexible portion 50 and the gas flow distribution device 46 may be constructed from stainless steel or other formable heat-resistant material in order to withstand elevated temperatures of the exhaust gas 26 frequently encountered within the exhaust system 28. As known by those skilled in the art, exhaust gas temperatures in a diesel engine may exceed 1,500 degrees Celsius, while exhaust gas temperatures in a gasoline engine may exceed 2,000 degrees Celsius.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A flexible coupling for routing and distributing an exhaust gas flow from an internal combustion (IC) engine, the coupling comprising:
   an upstream duct having a first end and a second end, and a gas flow distribution device arranged between the first and second ends of the upstream duct; and
   a downstream duct having a first end and a second end, and a flexible portion arranged between the first and second ends of the downstream duct;
   wherein the upstream duct is fixed to the downstream duct such that a continuous, sealed passage is generated for the exhaust gas flow between the first end of the upstream duct and the second end of the downstream duct.

2. The coupling according to claim 1, wherein the gas flow distribution device is arranged proximate the second end of the upstream duct.

3. The coupling according to claim 1, wherein the flexible portion is arranged proximate the first end of the downstream duct.

4. The coupling according to claim 1, wherein:
   the upstream duct extends at least partially through the downstream duct; and
   the upstream duct is fixed to the downstream duct proximate the first end of the downstream duct.

5. The coupling according to claim 1, wherein the first end of the upstream duct includes a mounting flange for attachment to one of an exhaust manifold and a turbocharger of the engine.

6. The coupling according to claim 5, wherein the second end of the downstream duct includes a mounting flange configured for attachment to an exhaust after-treatment device.

7. The coupling according to claim 1, wherein the flexible portion is configured as a corrugated pipe.

8. The coupling according to claim 1, wherein the flexible portion is defined by a length, and wherein the gas flow distribution device is arranged along the length of the flexible portion when the second end of the upstream duct is fixed to the downstream duct.

9. The coupling according to claim 8, wherein the flexible portion is arranged substantially concentrically around the gas flow distribution device when the second end of the upstream duct is fixed to the downstream duct.

10. The coupling according to claim 1, wherein each of the flexible portion and the gas flow distribution device is constructed from stainless steel.

11. A vehicle comprising:
    an internal combustion (IC) engine configured to power the vehicle;
    an exhaust after-treatment (AT) device configured to receive and process an exhaust gas flow from the IC engine;
    a coupling configured to route the exhaust gas flow from the IC engine and distribute the exhaust gas flow to the AT device, the coupling including:
    an upstream duct having a first end and a second end, and a gas flow distribution device arranged between the first and second ends of the upstream duct; and
    a downstream duct having a first end and a second end, and a flexible portion arranged between the first and second ends of the downstream duct;
    wherein the upstream duct is fixed to the downstream duct such that a continuous, sealed passage is generated for the exhaust gas flow between the first end of the upstream duct and the second end of the downstream duct.

12. The vehicle according to claim 11, wherein the gas flow distribution device is arranged proximate the second end of the upstream duct.

13. The vehicle according to claim 11, wherein the flexible portion is arranged proximate the first end of the downstream duct.

14. The vehicle according to claim 11, wherein:
    the upstream duct extends at least partially through the downstream duct; and
    the upstream duct is fixed to the downstream duct proximate the first end of the downstream duct.

15. The vehicle according to claim 11, wherein the first end of the upstream duct includes a mounting flange for attachment to one of an exhaust manifold and a turbocharger of the engine.

16. The vehicle according to claim 11, wherein the second end of the downstream duct includes a mounting flange configured for attachment to an exhaust after-treatment device.

17. The vehicle according to claim 11, wherein the flexible portion is configured as a corrugated pipe.

18. The vehicle according to claim 11, wherein:
the flexible portion is defined by a length;
the gas flow distribution device is arranged along the length of the flexible portion when the second end of the upstream duct is fixed to the downstream duct; and
the flexible portion is arranged substantially concentrically around the gas flow distribution device when the second end of the upstream duct is fixed to the downstream duct.

19. The vehicle according to claim 11, wherein each of the flexible portion and the gas flow distribution device is constructed from stainless steel.

20. The vehicle according to claim 11, further comprising a turbocharger operatively connected to the IC engine, wherein the coupling is arranged between the turbocharger and the AT device.

* * * * *